Patented Feb. 13, 1951

2,541,482

UNITED STATES PATENT OFFICE 2,541,482

PRODUCTION OF MONOHYDRIC ALCOHOL ESTERS

Richard Rosenbusch, Clayton, Manchester, England, assignor to Victor Wolf Limited, Clayton, Manchester, England, a British company; said Richard Rosenbusch now by judicial change of name Richard Rowe No Drawing. Application March 8, 1946, Serial No. 653,172. In Great Britain March 15, 1945

12 Claims. (Cl. 260—410.6)

1

This invention relates to improvements in the production of esters of organic acids employing hydrogen halide as the catalyst and is more especially suitable for the production of esters by alcoholysis of esters or by esterification of acids.

In the alcoholysis of esters, especially of glycerides, anhydrous hydrochloric acid has been known as a very effective catalyst. However, the necessity of first producing the gaseous product in a special generator before it is introduced into the reaction-mixture or into one of its components has generally prevented up to now the use of hydrochloric acid as catalyst for alcoholysis in practice.

It is possible, under certain conditions, to use concentrated aqueous hydrochloric acid instead of the gaseous hydrogen chloride, but in this case a certain degree of saponification is unavoidable, and the subsequent refining of the reaction product becomes necessary.

It has now been found that these difficulties can be substantially avoided according to the present invention wherein esters of organic acids are produced by alcoholysis or esterification employing hydrogen halide as catalyst, the hydrogen halide being produced within the alcohol used for the process or especially within the reaction mixture by interaction between a metal halide which is soluble in the reaction mixture or at least in the alcohol used and an acid which forms with the metal of the halide a salt which is insoluble or sparingly soluble in the reaction mixture under the prevailing conditions.

When the alcohol used is an aliphatic alcohol containing at most five carbon atoms in the molecule, the halides, and especially chlorides of lithium, calcium, magnesium, strontium, zinc, or bromides such as sodium and calcium bromides can be used. The alcohol-soluble halogenides of the alkaline earth metals, especially calcium chloride or magnesium chloride are the preferred salts and with any of these sulphuric acid or phosphoric acid may be employed for liberating the hydrogen halide.

Any ester may be used for the alcoholysis which is soluble in the alcohol employed, at least when warmed, especially natural glyceride oils such as for example, castor oil which is easily soluble in all aliphatic alcohols.

It is generally not necessary to work at elevated temperatures; thus, for example, the generation of hydrogen halide simultaneously with the alcoholysis of oils which are soluble in alcohols, say castor oil, can be performed without heating.

2

The process is preferably carried out in the substantial absence of water, but small quantities such as are present for example in the form of water of crystallisation in some of the halides are not objectionable to the alcoholysis.

Generally equivalent amounts of the halide and acid are used, and such a quantity that the hydrogen halide produced amounts to 1–2% of the reaction mixture. Should it be desirable to avoid any side-reaction with the sulphuric or other acid used to liberate the hydrogen halide, an excess of the halide can be provided.

The amount of alcohol may be large, as in the well known processes or relatively small as in British specification No. 563,481.

The described process offers the same advantages in the case of the production of esters by treatment of the acids themselves with alcohols in presence of hydrogen halides. Thus for example butyl ricinoleate can be produced by the addition of sulphuric acid to a mixture of castor oil fatty acids and butanol and calcium chloride.

The invention is applicable to the production of alkyl esters of fatty acids from natural glyceride oils or from fatty acids.

The invention will be further described by reference to the following four examples but it must be understood that these examples are included by way of illustration and the invention is not limited thereto:

*Example 1.*—1000 g. castor oil are mixed with a solution of 55 g. anhydrous calcium chloride in 750 g. of n-butanol. Then 50 g. of concentrated sulphuric acid are added gradually while stirring and cooling. The solution becomes more and more turbid and calcium sulphate separates out. After a few days the calcium sulphate is filtered and the filtrate washed repeatedly with water—which may contain common salt—in order to remove the mineral acid, the glycerine and the surplus of the butanol. Finally the oil—about 1100 g.—is distilled in vacuum whereby 1000–1100 g. of colourless oil consisting of the butyl esters of the castor oil fatty acids are obtained. (B. P. 217–235° at 3 mm).

*Example 2.*—A solution of 35 g. commercial anhydrous magnesium chloride containing about 20% water in 500 g. butanol is mixed with 500 g. olive oil. 27 g. concentrated sulphuric acid are added gradually; finally the mixture is heated on the water bath for about 7 hours. After cooling down the clear solution is separated from the magnesium sulphate by filtration and worked up according to Example 1. 550 g. raw esters are obtained. By distillation in vacuum (3 mm.)

510 g. of a mixture of the butyl esters of the olive oil fatty acids distil over at 205–219° C.

*Example 3.*—60 g. calcium chloride are dissolved in 650 g. n-propanol and mixed with 1000 g. castor oil. After addition of 36 g. phosphoric acid (s. g. 1.75) calcium-phosphate separates out gradually. After four days standing the reaction mixture is stirred with limestone and filtered when neutral. The propanol is distilled off and finally the residue distilled in vacuum. The distillate, about 1000 g., consists of the propanol esters of the castor oil fatty acids (S. V. 165).

*Example 4.*—90 g. concentrated sulphuric acid are added gradually to a solution of 180 g. sodium bromide in 2500 g. methanol. After 1 hour standing the sodium sulphate is filtered, 3000 g. linseed fatty acids are mixed with the filtrate and the whole stirred for 24 hours at room temperature. The reaction mixture is then poured into water and washed repeatedly with warm water until the whole hydrobromic acid is removed. The oil is dried and finally subjected to a vacuum distillation. The distillate (B. P. 180–192° C. at 2.5 mm.) is a mixture of the methyl esters of the linseed fatty acids (A. V. 190).

It will thus be apparent that essential steps comprising the invention can be carried out as follows:

The ester or the fatty acid used as raw material and the halogenide are dissolved in the alcohol whereafter the acid is added which sets free the hydrogen halide; subsequent treatment corresponds to the procedure used in the alcoholysis of esters by means of hydrogen halides. Alternatively, the reaction mixture can be prepared wherein the halogenide is first dissolved in the alcohol and the hydrogen halide set free by addition of the acid, subsequently, the ester or fatty acid is added thereto, with or without previous filtration of the precipitated salt.

I declare that what I claim is:

1. Process for the production of esters from a reaction mixture in which a monohydric alcohol having from 1 to 5 carbon atoms is reacted with a compound selected from the group consisting of fatty acids containing at least 6 carbon atoms and esters of said fatty acids with alcohols other than the alcohol used in the reaction employing as a catalyst dissolved in the reaction mixture a hydrogen halide selected from the group which consists of hydrogen chloride and hydrogen bromide which process comprises producing the said hydrogen halide in at least one of the components of the said reaction mixture by dissolving a metal salt of said hydrogen halide in at least one of said components and adding to the resulting solution an acid which forms with the metal of said metal salt a different salt which is no more than sparingly soluble in said reaction mixture under the prevailing conditions.

2. Process for the production of esters from a reaction mixture in which a monohydric alcohol having from 1 to 5 carbon atoms is reacted with a compound selected from the group consisting of fatty acids containing at least 6 carbon atoms and esters of said fatty acids with alcohols other than the alcohol used in the reaction employing hydrogen chloride as a catalyst dissolved in the reaction mixture which comprises producing said hydrogen chloride within said reaction mixture by dissolving a metal chloride in said reaction mixture and adding to the resulting solution an acid which forms with the metal of said metal chloride a different salt which is no more than sparingly soluble in said reaction mixture under the prevailing conditions.

3. Process for the production of esters by alcoholysis of glycerides of fatty acids containing at least 6 carbon atoms using monohydric alcohols having from 1 to 5 carbon atoms and employing hydrogen chloride as a catalyst dissolved in the reaction mixture which comprises producing said hydrogen chloride within said reaction mixture by dissolving a metal chloride in said reaction mixture and adding to the resulting solution an acid which forms with the metal of said metal chloride a different salt which is no more than sparingly soluble in said reaction mixture under the prevailing conditions.

4. Process for the production of esters by esterification of fatty acids containing at least 6 carbon atoms with monohydric alcohols having from 1 to 5 carbon atoms employing as a catalyst dissolved in the reaction mixture a hydrogen halide selected from the group which consists of hydrogen chloride and hydrogen bromide which comprises producing said hydrogen halide within the said reaction mixture by dissolving a metal halide in said reaction mixture and adding to the resulting solution an acid which forms with the metal of said metal halide a different salt which is no more than sparingly soluble in the said reaction mixture under the prevailing conditions.

5. Process for the production of esters from a reaction mixture in which a monohydric alcohol having from 1 to 5 carbon atoms is reacted with a compound selected from the group consisting of fatty acids containing at least 6 carbon atoms and esters of said fatty acids with alcohols other than the alcohol used in the reaction employing hydrogen chloride as a catalyst dissolved in the reaction mixture which comprises producing said hydrogen chloride in at least one of the components of the said reaction mixture by dissolving an alkaline earth chloride in at least one of said components and adding sulphuric acid to the resulting solution.

6. Process for the production of esters by alcoholysis of glycerides of fatty acids containing at least 6 carbon atoms by means of monohydric alcohols having from 1 to 5 carbon atoms and employing as a dissolved catalyst a hydrogen halide selected from the group which consists of hydrogen chloride and hydrogen bromide which comprises producing said hydrogen halide in at least one of the components of the reaction mixture by dissolving a metal salt of said hydrogen halide in at least one of said components and adding to the resulting solution an acid which forms with the metal of the halide a different salt which is no more than sparingly soluble in said reaction mixture under the prevailing conditions.

7. Process for the production of esters by alcoholysis of glycerides of fatty acids containing at least 6 carbon atoms by means of monohydric alcohols having from 1 to 5 carbon atoms and employing as a dissolved catalyst a halide selected from the group which consists of hydrogen chloride and hydrogen bromide which process comprises producing said hydrogen halide in at least one of the components of the said reaction mixture by dissolving an alkaline earth metal salt of said hydrogen halide in at least one of said components and adding to the resulting solution an acid which forms with the metal of the alkaline earth metal salt a different salt which is no more than sparingly soluble in said reaction mixture under the prevailing conditions.

8. Process for the production of esters by esterification of fatty acids containing at least 6 carbon atoms with monohydric alcohols having from 1 to 5 carbon atoms employing hydrogen chloride as a dissolved catalyst which comprises producing said hydrogen chloride in at least one of the components of the said reaction mixture by dissolving a metal chloride in at least one of said components and adding to the resulting solution an acid which forms with the metal of said metal chloride a different salt which is no more than sparingly soluble in the said reaction mixture under the prevailing conditions.

9. Process for the production of esters by alcoholysis of castor oil using normal butanol employing hydrochloric acid as a dissolved catalyst comprising producing said hydrochloric acid within the reaction mixture by dissolving calcium chloride in the reaction mixture and adding thereto sulphuric acid whereby calcium sulphate is precipitated.

10. Process for the production of esters of castor oil fatty acids from a reaction mixture in which a normal primary monohydric alcohol having from 1 to 5 carbon atoms is reacted with a compound selected from the group consisting of castor oil and castor oil fatty acids employing hydrogen chloride as a dissolved catalyst which comprise producing said hydrogen chloride in at least one of the components of the reaction mixture by dissolving a metal chloride in at least one of said components and adding to the resulting solution an acid which forms with the metal of said metal chloride a different salt which is no more than sparingly soluble in said reaction mixture under the prevailing conditions.

11. Process for the production of esters by esterification of linseed fatty acids using methyl alcohol and employing hydrobromic acid as a dissolved catalyst wherein said hydrobromic acid is produced within said methyl alcohol before addition of linseed fatty acids thereto by interaction between sodium bromide dissolved in said methyl alcohol and sulphuric acid, whereby sodium sulphate is precipitated.

12. Process for the production of esters of castor oil fatty acids as claimed in claim 10 in which the metal chloride employed is magnesium chloride.

RICHARD ROSENBUSCH.

REFERENCES CITED

The following references are of record in the file of this patent:

UNITED STATES PATENTS

| Number | Name | Date |
| --- | --- | --- |
| 2,160,532 | Barrett | May 30, 1939 |
| 2,208,362 | Engel | July 16, 1940 |
| 2,267,730 | Grosse et al. | Dec. 30, 1941 |
| 2,384,793 | Bruun et al. | Sept. 18, 1943 |